A. SWASEY.
SIGHT FOR FIREARMS.
APPLICATION FILED MAY 3, 1910.
964,709.
Patented July 19, 1910.
2 SHEETS—SHEET 1.
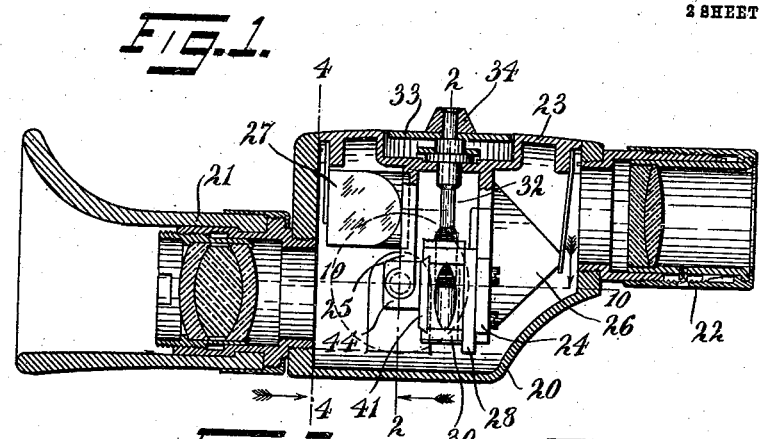
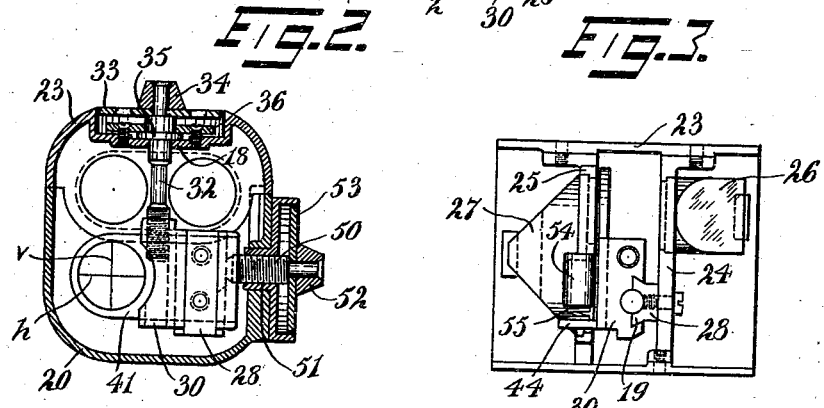
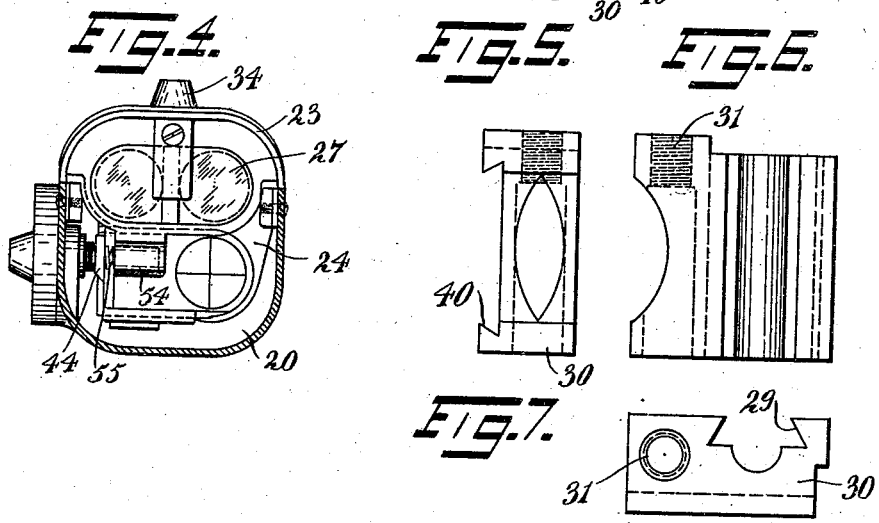
Witnesses:
L. C. Badeau.
H. D. Penney
Inventor:
Ambrose Swasey,
By his Attorney,
F. H. Richards.

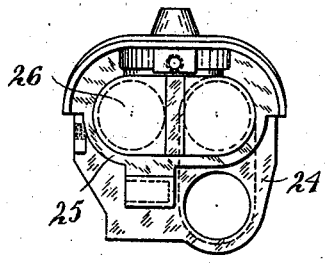
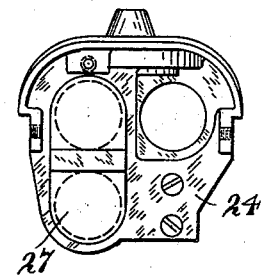
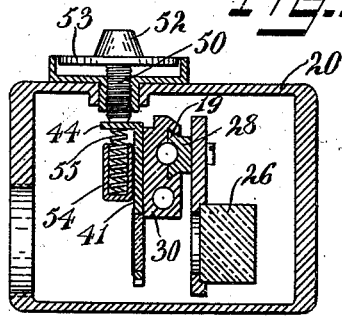
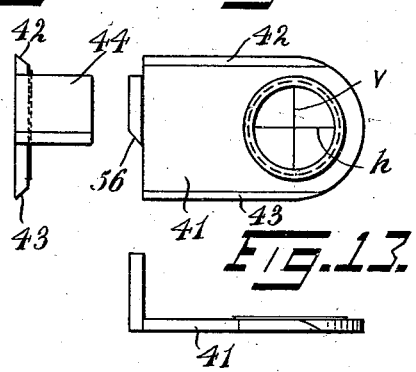
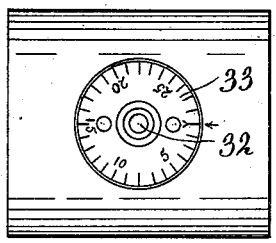

UNITED STATES PATENT OFFICE.

AMBROSE SWASEY, OF CLEVELAND, OHIO, ASSIGNOR TO THE WARNER & SWASEY COMPANY, OF CLEVELAND, OHIO, A CORPORATION OF OHIO.

SIGHT FOR FIREARMS.

964,709.  Specification of Letters Patent.  Patented July 19, 1910.

Application filed May 3, 1910. Serial No. 559,176.

*To all whom it may concern:*

Be it known that I, AMBROSE SWASEY, a citizen of the United States, residing in Cleveland, in the county of Cuyahoga and State of Ohio, have invented certain new and useful Improvements in Sights for Firearms, of which the following is a specification.

This invention relates to an optical sighting instrument such as a gun sight employing a removable cap member carrying the reflecting element such as porro prisms, and has for its object to provide a member carrying cross lines or wires that is mounted on the removable member; the removable member carrying one of the means of adjustment for the cross lines, and the body member of the instrument carrying the means of adjustment for the other member; by which arrangement the porro prisms can be removed for cleansing and replaced in the precise former position and the cross lines or wires, upon reassemblage of the members being in the precise same position of adjustment.

In the accompanying drawing representing an embodiment of my invention, Figure 1 is a vertical section through the instrument. Fig. 2 is a broken section on the line 2—2 indicated in Fig. 1. Fig. 3 is a bottom plan view of the removable member. Fig. 4 is a section on the line 4—4 indicated in Fig. 1. Figs. 5, 6 and 7 show different views of the slidable support. Fig. 8 is one end view of the removable holder, and Fig. 9 is a view of the opposite end. Fig. 10 is a horizontal section on the line 10—10 of Fig. 1. Figs. 11, 12 and 13 show different views of the slide that carries the cross lines or wires; and Fig. 14 is a plan of the holder member.

The device is shown as comprising a body member 20, having an eye piece member 21, and an objective member 22, the arrangement of which forms no part of the present invention. The body member has its top portion open or removed for the reception of a holder member comprising essentially a cap or top portion 23, from which depend two supporting walls 24 and 25. The said walls support the reflecting elements, preferably porro prisms 26 and 27 respectively secured thereto in any desired manner, which are usually arranged with their longitudinal axes perpendicular, to cause the usual double refraction at each member, to take the rays from the objective 22 and direct them into the eye piece 23; which latter two members are arranged out of alinement.

On the wall 24 is mounted a guide member 28, having a dove-tailed portion 19 sliding in a dove-tailed recess 29 in a support 30, that is shown separately in Figs. 5–7. The support has a screw-threaded bore 31 in which operates a screw threaded rod 32, that projects through the top of the holder member and carries a dial 33, and an operating head 34, whereby the screw can be turned to bring various indicating marks on the dial to register with a given mark adjacent thereto on the cap of the holder. The endwise movement of the screw rod is prevented by disk 35 thereon engaged by the socket portion 18 of the cap on one side and by an overhanging ring plate 36 on the other.

The support 30 has another dove-tailed slot or channel 40, in which reciprocates a slide member 41, shown separately in Figs. 11–13, the bevel edges 42 and 43 of the slide engaging the side walls of this channel. It will be observed that the path of this slide is at right angles to the path of movement of the support on the guide member 28, that engages its channel 29. This slide member carries the cross lines of the instrument, and these may be of any desired construction, either actually filament members such as wires, threads, or spider web; or they may be lines etched on a transparent member such as glass. In this application the term "cross-lines" is used to comprehend any desired arrangement that will produce the effect of minute filaments. The vertical line $v$ is parallel with the path of movement of the holder member in its guide; while the horizontal line $h$ is parallel with the path of movement of the slide. Consequently, the shifting of the support by the said screw adjustment will bodily move the horizontal line $h$ in a vertical path; while the movement of the slide on the holder will bodily shift the vertical line $v$, in a horizontal direction.

The means for shifting the slide on the support, independent of any movement of the support, in the present invention is shown as comprising a screw member 50 turning in a threaded bore 51 in the body member, and provided with a head 52 and a dial 53. The extremity of this screw member will engage an abutment wall or extension 44 on the slide member 41, and serve to advance the slide in one direction. Resilient means carried by the support are provided, to engage the slide member and advance it in the other direction; in other words to retain it in engagement with the extremity of the screw 50. A box member 54 is mounted on the support member 30 and carries a coil spring 55, that presses against the abutment 44 on the opposite side from that engaged by the screw, as clearly shown in Fig. 10.

It will be observed that the screw member 50 merely engages the abutment wall, but has no direct connection therewith. Therefore the holder member carrying the slide and the support therefor can be withdrawn from the body of the instrument without disconnecting the parts. The abutment member will merely slide off the end of the screw as the slide is moved out of the instrument upon withdrawing the holder. For returning the same, one edge of the abutment is preferably beveled as shown at 56 in Fig. 12, to engage the screw and compress the spring. Since the spring presses the abutment of the slide against the end of the adjusting screw, when the holder is removed and reassembled, this spring will cause the slide to be returned to its precise former position. And the other screw adjustment being carried by the removable holder entirely, no alteration whatever is made in its adjustment upon removal and reinsertion of the holder.

Having thus described my invention, I claim:

1. In a sighting telescope, the combination of a body having an opening, a holder member having reflecting elements mounted therein, the holder having a cap portion arranged to close the opening in the body when inserted, a slide member having vertical and horizontal cross-lines thereon and slidably carried by the said holder, means on the holder having an operative member outside thereof for shifting the slide member in a path corresponding with one of said cross-lines, an operating member mounted on the body, and means carried by the holder causing engagement of the operating member with the said slide for traversing the slide in the path of the other of said cross-lines, whereby the slide is given two movements in perpendicular paths.

2. In a sighting telescope, the combination of a body having an opening, a holder member having reflecting elements mounted therein, the holder having a cap portion arranged to close the opening in the body when inserted, a slide member having vertical and horizontal cross-lines thereon and slidably carried by the said holder, means on the holder having an operative member outside thereof for shifting the slide in a path corresponding with one of said cross-lines, an operating member mounted on the body, and means carried by the holder causing engagement of the operating member with the said slide for traversing the slide in the path of the other of said cross-lines, whereby the slide is given two movements in perpendicular paths, the said operating means on the holder and the said coöperating means on the slide being organized to connect and disconnect by the act of insertion and removal of the slide.

3. In a sighting telescope, the combination of a body having an opening therein, a holder carrying reflecting elements, a support movable in guides in the holder, an operating member on the holder for the support, a slide movable on the support in a path perpendicular to the path of movement of the support, perpendicular cross-lines carried by the slide and extending in the paths of movement of the slide and of the support respectively, and means carried by the body for shifting the slide in its said path movement.

4. In a sighting telescope, the combination of a body having an opening therein, a holder carrying reflecting elements, a support movable in guides in the holder, an operating member on the holder for the support, a slide movable on the support in a path perpendicular to the path of movement of the support, perpendicular cross-lines carried by the slide and extending in the said paths of movement of the slide and of the support respectively, the slide carrying an abutment portion, an operating member carried by the body arranged to contact with said slide abutment, said operating member being arranged to connect and disconnect with the slide by the act of insertion and removal of the holder.

5. In a sighting telescope, the combination of a body having an opening therein, a holder carrying reflecting elements, a support movable in guides in the holder, an operating member on the holder for the support, a slide movable on the support in a path perpendicular to the path of movement of the support, perpendicular cross-lines carried by the slide and extending in the said paths of movement of the slide and of the support respectively, the slide carrying an abutment portion, an operating member carried by the body arranged to contact with said slide abutment, said operating member being arranged to connect and disconnect with the slide by the act of insertion and removal of the holder, and a resilient member carried by the support arranged to engage said abutment member to press it into engagement with the said operating member.

6. In a sighting instrument, the combination of a body having an opening therein, a holder carrying reflecting elements, a support slidable in the holder, means on the outside of the holder for sliding the support in a certain path, a slide shiftable on the holder in a path at right angles to the path of movement of the support, cross-lines on the slide extending in the respective paths of movement of the slide and of the support, an abutment on the slide, a spring carried by the support engaging the abutment to advance the slide in one direction of its movement, a screw member mounted in the body having an operating portion outside thereof, said screw member being arranged to engage said abutment to advance the slide in one direction against the pressure of the spring whereby the slide is reciprocated on the support.

7. In a sighting instrument, the combination of a body having an opening therein, a holder carrying reflecting elements, a support slidable in the holder, means on the outside of the holder for sliding the support in a certain path, a slide shiftable on the holder in a path at right angles to the path of movement of the support, cross-lines on the slide extending in the respective paths of movement of the slide and of the support, an abutment on the slide, a spring carried by the support engaging the abutment to advance the slide in one direction of its movement, a screw member mounted in the body having an operating portion outside thereof, said screw member being arranged to engage said abutment to advance the slide in one direction against the pressure of the spring whereby the slide is reciprocated on the support, the abutment member having a beveled edge for engagement with the end of the screw member.

8. In a sighting telescope, the combination of a body, a holder member having optical elements mounted therein, a slide member having vertical and horizontal cross lines thereon and slidably carried by the said holder, means on the telescope having an operative member outside thereof for shifting the slide in a path corresponding with one of said cross-lines, and an operating member arranged to traverse the slide in the path of the other of said cross lines whereby the slide is given two movements in perpendicular paths.

9. In a sighting telescope, the combination of a body, a holder member having optical elements mounted therein, a slide member having vertical and horizontal cross lines thereon and slidably carried by the said holder, means on the holder having an operative member outside thereof for shifting the slide in a path corresponding with one of said cross-lines, an operating member mounted on the body, and means carried by the holder causing engagement of the operating member with the said slide for traversing the slide in the path of the other of said cross lines whereby the slide is given two movements in perpendicular paths, the said operating means on the holder and the said coöperating means on the slide being organized to connect and disconnect upon the insertion and removal of the slide.

AMBROSE SWASEY.

Witnesses:
  G. FECKER,
  E. P. BURRELL.